United States Patent Office 3,409,574
Patented Nov. 5, 1968

3,409,574
MARKING MATERIALS COMPRISING LOW-PRESSURE POLYETHYLENE, HIGH-PRESSURE POLYETHYLENE AND PLASTICIZER
Jean Ferdinand Gros, Agen, France, assignor to The Mead Corporation, Dayton, Ohio, a corporation of Ohio
No Drawing. Filed July 2, 1965, Ser. No. 469,312
Claims priority, application France, July 10, 1964, 981,389
12 Claims. (Cl. 260—23)

ABSTRACT OF THE DISCLOSURE

An erasable and sharpenable crayon comprises a homogeneous mixture of polyethylene, at least one plasticizer compatible with polyethylene, a coloring material, and a filler. The polyethylene is present in an amount between 30% and 60% by weight of the whole, the plasticizer between 10% and 50% by weight of the whole, and the coloring material and filler in an aggregate amount between 5% and 50% by weight of the whole. The polyethylene is a blend of low-pressure polyethylene and high-pressure polyethylene in a weight ratio of the former to the latter between 0.25 and 1.5.

---

The present invention relates to plastic-base marking substances which can be employed for writing or drawing on material media such as paper, board, slate, stone, metal, plastic material, leather or hide.

It is already known to produce marking substances having a base of plastic materials, said plastic materials being mixed with plasticizers, solvents, pigments and loading materials of different kinds. The plastic materials proposed for products of this kind are of many different types, whether thermoplastic or thermosetting, which are obtained from natural or synthetic resins, cellulose derivatives, organic or inorganic derivatives or elastomers such as natural or synthetic rubber. Among the synthetic resins which have been contemplated for use in the manufacture of marking substances, reference can be made indifferently to the solid high polymers of hydrocarbons (such as polyethylene) or their halogenated compounds such as polyvinyl chloride, polytetrafluoroethylene, chlorotrifluoroethylene.

However, the known applications of marking substances of this type have exhibited the following disadvantages:

Automatic forming of these products either by molding or by extrusion is difficult and unreliable and very often results in products which are too hard or too soft, thus making them impossible to manufacture on a large scale.

The marking substances which have been obtained up to the present time are difficult to use since they frequently break at the first impact or else become soft and leave marks on the hands when held by the user. This makes it necessary to varnish their external surface or else to employ them with a holder in order to facilitate handling.

The known marking substances are often difficult to sharpen without resorting to apparatuses which are specially designed for that purpose.

Moreover, it has been found that the marking or covering power in tests performed up to the present time is distinctly inferior to that of marking substances of conventional structure (colored pencils, for example), with the result that plastic-base marking substances have not thus far been able to compete with the conventional products referred to.

Finally, the plastic-base marking substances which have been known up to the present time, as in the case of marking substances of conventional composition, leave on the writing medium a mark which results from rubbing and from partial wear of said medium, with the result that obliteration of the mark or inscription especially by means of a rubber eraser impairs the medium and soils the eraser to a greater or lesser extent.

The object of this invention is to overcome all of the disadvantages noted above, and primarily to provide a marking compound having a plastic base which can readily be mass-produced, which does not soil users' hands, which is practically unbreakable, which is easy to sharpen, which makes it possible to mark inscriptions of any desired color or in black, which is fast to light, which produces a sharpness of line superior to that produced by conventional pencils and crayons and which, in spite of their excellent adhesive power, can nevertheless be very easily erased.

In accordance with the invention, the marking substances which are obtained by forming of a mixture and which consist of a thermoplastic material, a plasticizer and a pigment are mainly characterized in that the thermoplastic material consists both of "low-pressure" polyethylene and of "high-pressure" polyethylene.

Preferably, the total weight of the "low-pressure" polyethylene and "high-pressure" polyethylene is substantially within the range of 30 to 60% of the total weight of material of the marking substance and the ratio of the weight of "low-pressure" polyethylene to the weight of "high-pressure" polyethylene which go to make up the plastic material is within the range of 0.25 to 1.5.

Further particular features of the marking substances in accordance with the invention will become apparent hereinafter.

There will now be described in detail a certain number of characteristics of the constituents of the plastic compound which permits of the manufacture of marking substances according to this invention.

THERMOPLASTIC MATERIAL

This material is essentially constituted by the association of "low-pressure" polyethylene and "high-pressure" polyethylene and advantageously has the following characteristics:

The "low-pressure" polyethylenes have a grade which is preferably within the range of 9 to 13. It should be explained that the grade considered is that which corresponds to the international scale, the grade being measured by the number representing the weight as expressed in grams of materials which pass into an extrusion plastometer over a period of 10 minutes through an aperture of 2.08 mm. under a pressure of 1.13 kgs./cm.$^2$ and at a temperature of 190° C. It has been established that these "low-pressure" polyethylenes can be selected especially among the polyethylenes obtained according to the so-called modified Ziegler process. This process essentially consists in polymerizing the low-pressure polyethylene in the presence of a catalyst such as a mixture of titanium chloride and titanium sesquichloride. These polyethylenes have a melting point in the vicinity of 135° C., a very stable density in the vicinity of 0.955, a molecular weight which is substantially equal to 80,000 and a crystallinity factor which is substantially within the range of 75 to 90%. Their molecular structure depends on the number of repetitions of a pattern containing a $CH_3$ group. This number is 2 or 3 in the case of the polyethylenes obtained in accordance with the modified Ziegler process whereas it attains 5 to 6 in the case of polyethylenes obtained in accordance with other processes.

The "high-pressure" polyethylenes preferably have a grade corresponding to the definition recalled earlier which is comprised between 7 and 20. It has been established that these polyethylenes have a melting point which is substantially within the range of 110 to 115° C., a molecular weight substantially equal to 50,000 and that they have a crystallinity factor approximately within the range of 55 to 60%.

The crystallinity factors indicated above in the case of the "low-pressure" polyethylenes and "high-pressure" polyethylenes are again obtained when they are fused and when they are allowed to cool completely. These crystallinity factors are therefore those of polyethylenes in the state in which they are present in the marking substances as manufactured in accordance with the invention. A large number of tests performed have shown that the most favorable result was obtained in the case of marking substances with the mixture of "low-pressure" polyethylenes and "high-pressure" polyethylenes in a weight ratio which is substantially within the range 0.25 to 1.5. The preferred average composition which corresponds to the most common applications is the following:

⅓ "low-pressure" polyethylene
⅔ "high-pressure" polyethylene corresponding to a weight ratio of 0.50.

However, these proportions can vary within the limits indicated above depending on particular applications of the marking substances such as writing on polished objects or on hide, drawings, special industrial uses.

As has been stated above, both types of polyethylene considered together represent on the other hand a proportion by weight of approximately 30 to 60% of the total weight of the mixture.

Outside of the limits indicated, the marking substances obtained do not have satisfactory fusibility and mechanical properties. In the case of the ordinary grades which correspond to the average composition given earlier, the marking substances must exhibit the following characteristics of fusibility:

Melting point: higher than or equal to 100° C.
Vicat softening point: higher than or equal to 85° C.

The values given above are suitable in the case of marking substances for ordinary use which are not substantially affected by the extreme temperatures of temperate zones both from the point of view of strength and marking power.

However, these limits can vary substantially depending on the use for which the marking substances are intended. For example, a crayon or pencil which is intended for the purpose of marking hide must have a distinctly lower melting point in order to have an effective marking power.

Lowering of the melting point is obtained in different ways:

Reduction of the ratio of high-pressure polyethylene to low-pressure polyethylene;
Reduction of the overall percentage content of polyethylene;
Incorporation of more readily fusible or even liquid plasticizers at normal temperature.

Conversely, marking substances which are intended for the purpose of marking on hard or rough media such as wood, stone, concrete and the like must have opposite characteristics. This result is obtained by:

Increase in the ratio of high-pressure polyethylene to low-pressure polyethylene;
Increase in the overall percentage content of polyethylenes;
Incorporation of plasticizers having a high melting point as well as inorganic loading materials—or fillers—which are more compact and have a higher degree of hardness such as, for example: clay and bentonite instead of talcum and kaolin;

Introduction into the mixtures of higher olefin polymers, whether halogenated or not.

In fact, there can be added to the essential base mixture of high and low pressure polyethylenes other synthetic resins such as polymers of higher hydrocarbons or their halogenated derivatives. Among these substances can be mentioned polyvinyl chloride, polyisobutylene, polypropylene or else halogenated derivatives of polyethylene. These products are in a minor proportion compared with the mixture of "high-pressure" and "low-pressure" polyethylenes. For example, they can represent 1 to 5% by weight of this mixture.

PLASTICIZER

This term designates an agent which is intended in a general manner to endow the composition with the desired plasticity in order to ensure marking under the requisite conditions, the effect of this agent being to provide, with the polyethylenes referred-to above homogeneous mixtures.

Depending on the use for which the marking substances are intended to be employed, the plasticizer can advantageously be selected among the following substances:

Lubricating substances which are fusible at a temperature below 100° C. and comprising, among others, the paraffin waxes, the melting point of which is substantially within the range of 50 to 66° C., petroleum jellies, micro-crystalline waxes.
The following synthesis products: synthetic waxes, fatty esters of glycols, the melting point of which is substantially within the range of 60 to 100° C.
Fats of vegetable origin, in particular Carnauba wax and Candellila wax, beeswax, cocoa butter or karite butter, oil seeds such as castor oil, soybean oil, colza oil or hydrogenated or sulphonated derivatives of these fats.
Fats of animal origin, in particular whale oil, seal oil or these oils converted by hydrogenation.
Solid plasticizers in powdered form and consisting of fatty acid salts of alkaline and alkaline earth metals and aluminum, in particular, the stearates, oleates, myristates, adipates, sebacates, palmitates of sodium, potassium, lithium, calcium, magnesium, aluminum.

This last-mentioned group is particularly important and is suitable for the usual applications of marking substances.

As will be understood, it is also possible to associate in the composition of marking substances plasticizers which belong to these different categories. The double condition to be verified is that the plasticizers are compatible with the polyethylenes under normal conditions of use and that they impart an appreciable writing powder to the marking substances.

The plasticizers of animal origin are mainly employed in the manufacture of marketing substances which are intended for inscriptions on polished objects such as metals, plastic materials and glass or on hide or mucous membranes.

The average proportion of plasticizers represents preferably 10 to 50% by weight of the final composition.

PIGMENTS

The pigments are chosen among the usual types employed in the manufacture of colored pencils, pastel crayons, art chalks and the like. Reference can be made in particular to the mineral pigments such as lead chromate, alkaline ferricyanides, graphites, aluminum powder and organic pigments such as acetylene blacks, coloring agents of paranitraniline, phthalocyanine, alphanaphthylamine, anthraquinone and similar coloring agents.

The proportion of pigments is as a rule 5 to 20% by weight of the total mixture.

LOADING MATERIALS

These materials are selected among the usual mineral loading materials. There can be mentioned in particular talcum, kaolin, bentonite, clay, kieselguhr, the alkaline-earth carbonates and sulphates, the metal oxides and similar substances.

The proportion of loading materials can range from 0 to 30% by weight of the mixture.

By way of non-limitative example, there is given below the composition by weight of a number of different mixtures for the manufacture of marking substances.

Example 1.—Typical mixture for colored marking substances

| Constituent: | Percentage by weight |
| --- | --- |
| "High-pressure" polyethylene | 30 |
| "Low-pressure" polyethylene | 15 |
| Paraffin wax | 8 |
| Polybutylene | 2 |
| Synthetic wax | 8 |
| Calcium stearate | 7 |
| Colored organic pigment | 10 |
| Mineral loading materials | 20 |

Example 2.—Colored marking substances for marking on a hard medium such as wood or stone

| Constituent: | Percentage by weight |
| --- | --- |
| "High-pressure" polyethylene | 25 |
| "Low-pressure" polyethylene | 20 |
| Polytetrafluoroethylene | 2 |
| Microcrystalline waxes (melting point: 65° C.) | 8 |
| Synthetic waxes (melting point: +65° C.) | 6 |
| Magnesium stearate | 8 |
| Organic pigments | 10 |
| Hard mineral loading materials, (clay) | 21 |

Example 3.—Colored marking substances for writing on hide

| Constituent: | Percentage by weight |
| --- | --- |
| "High-pressure" polyethylene | 32 |
| "Low-pressure" polyethylene | 8 |
| Polyisobutylene | 4 |
| Paraffin wax (melting point: +52° C.) | 12 |
| Synthetic waxes (melting point: −60° C.) | 9 |
| Calcium stearate | 8 |
| Organic pigments | 7 |
| Mineral loading materials (talcum, titanium oxide) | 20 |

Example 4.—(Marking substances for the same purpose as Example 3)

| Constituent: | Percentage by weight |
| --- | --- |
| "High-pressure" polyethylene | 32 |
| "Low-pressure" polyethylene | 8 |
| Polyisobutylene | 4 |
| Paraffin wax (melting point: +52° C.) | 8 |
| Synthetic waxes (melting point: −60° C.) | 6 |
| Cocoa butter | 4 |
| Paraffin oil | 3 |
| Calcium stearate | 8 |
| Organic pigments | 7 |
| Mineral loading materials | 20 |

Example 5.—Graphite-base marking substances for writing in black

| Constituent: | Percentage by weight |
| --- | --- |
| "High-pressure" polyethylene | 32 |
| "Low-pressure" polyethylene | 12 |
| Microcrystalline waxes | 8 |
| Polyisobutylene | 3 |
| Synthetic waxes | 5 |
| Calcium stearate | 6 |
| Graphite | 30 |
| Carbon black | 4 |

Example 6.—Graphite-base marking substances

Composition different from the preceding in that polyisobutylene is replaced by a resin such as: coumarone resin, vinyl acetate resin.

Example 7.—Colored marking substances of large diameter (10 to 15 mm.)

| Constituent: | Percentage by weight |
| --- | --- |
| "High-pressure" polyethylene | 34 |
| "Low-pressure" polyethylene | 8 |
| Paraffin waxes | 10 |
| Microcrystalline waxes | 8 |
| Calcium stearate | 6 |
| Organic coloring agents | 5 |
| Mineral loading materials (talcum, kaolin) | 29 |

Example 8.—Graphite-base marking substances such as those employed in wood-working (carpenters' pencils)

Same composition as in Example 7, the organic coloring agents and mineral loading materials being replaced by: graphite, 34%.

Example 9.—Marking substances intended for hot working of metals (welding)

These marking substances must contain a high percentage of titanium oxide, the talcum and kaolin of Example 7 being replaced by: titanium oxide, 29%.

Example 10.—Marking substances intended for marking plastics

| Constituent: | Percentage by weight |
| --- | --- |
| "High-pressure" polyethylene | 28 |
| "Low-pressure" polyethylene | 22 |
| Paraffin wax (melting point: 52° C.) | 9 |
| Cocoa butter | 6 |
| Calcium stearate | 8 |
| Mineral pigment | 7 |
| Mineral loading materials (talcum, kaolin) | 20 |

Experience shows that the marking substances which are thus obtained have the remarkable property which has been pointed out earlier, of leaving on the medium on which a mark or inscription has been made a colored or black film (graphite-base substances) which has excellent covering power and is fast to light.

In spite of its excellent adhesion to usual media such as paper, board and the like, this film or pellicle can readily be obliterated simply by means of a rubber eraser, without causing damage to the medium. Since the plastic compound permits the use of a wide variety of pigments, all writing and drawing colors can be obtained.

The association of polyethylenes as provided by the invention ensures a particularly satisfactory agglomeration of the different constituents of the compound. However, experience has shown in addition that, although the polyethylenes do not themselves have any marking power, they are able to acquire this power from their association with the other constituents. In fact, the mark which is left on the medium contains all the elements of the composition including polyethylene.

Furthermore, the association of polyethylenes also imparts to the marking substances the characteristic properties of polyethylenes, viz:

a high modulus of elasticity;
high impact resistance;
a sufficiently high breaking strength.

In point of fact, the marking substances in accordance with the invention which consist of homogeneous material for marking purposes are practically unbreakable under shock or impact. They can be thrown violently onto the ground without danger.

Also, by virtue of their high melting point and softening point, they have a further valuable property in that they do not leave marks when brought into contact with the user's hands and, when they are sharpened, they only leave shavings which are not liable to soil and no longer leave dust as in the case of ordinary black or colored leads used in conventional pencils, crayons or chalks.

It should further be noted that the mixture of polyethylenes as hereinabove defined lends itself remarkably well to the manufacture of marking substances by extrusion, as will be seen later.

It seems justified to attribute this combination of advantageous properties of marking substances as contemplated by the invention, mainly to the particularly high affinity of the polyethylenes, as chosen according to the above-defined criteria, for the plasticizers which are fusible at a temperature below 100° C. and which are employed in the composition of these substances.

On the contrary, the use of "high-pressure" polyethylene alone would produce a mixture having melting and softening points which would be below the limits specified above and which would result in marking substances having unsuitable mechanical properties.

Moreover, should it prove desirable to produce these substances by extrusion, insuperable difficulties would be encountered on account of the deformations which take place as the material passes out of the die opening and which are caused by too low viscosity of the mixture and too slow return to the crystalline phase which, in the case of these polymers, is already limited.

The use of "low-pressure" polyethylene alone would necessitate the use of large quantities of fusible plasticizers in order to provide a remedy for increase in hardness. This would accordingly give rise to difficulties in producing the mixture, a further danger of subsequent separation of the constituents and a danger of impairment of the organic pigments as a result of the use of a higher fusion temperature.

The marking substances which are contemplated by this invention offer, in addition to the advantages which have now been indicated, the following interesting features:

Excellent resistance to atmospheric agents, thus permitting of easy preservation.
A non-toxic character, with the result that any contact between these marking substances and a user's mouth gives rise to no danger.
The property of leaving no mark on a rubber eraser when an inscription is erased, with the result that there is no risk of soiling the paper, which is another surprising feature.
The property of being slightly supple and of being smooth without requiring either polishing or varnishing, thereby making them particularly agreeable to handle.
Contact between the marking substances and the medium is agreeable and marking is easy.

The method of manufacture of marking substances in accordance with the arrangements hereinabove described is mainly characterized in that the high-pressure and low-pressure polyethylenes are mixed when hot and that the plasticizers, pigments and loading materials are incorporated therewith, whereupon the mixture is formed in sheets, granulated, then shaped by extrusion.

In one practical mode of execution of the process referred-to above, the following sequence of operations is advantageously performed:

Milling of the pigments and mineral loading materials. This operation is carried out in rotary mill at high speed, the powders being previously mixed. The powders must pass through a 300-mesh screen.
Fusion of the plasticizers in a heating mixer at 180–200° C.
Addition to the mass of molten waxes referred-to above, of the "high-pressure" and "low-pressure" polyethylenes in decreasing order of magnitude of their melting points, then the polymer of olefins belonging to the group of vinyls, butylenes and propylenes, whether halogenated or not. After mixing, the temperature is lowered to approximately 140° C. over a period of 60 to 90 minutes, at the end of which period the fusion must be complete.
Addition to the mass obtained during the preceding operation, of mineral loading materials and pigment. The temperature is maintained at 140° C. over a period of 30 to 40 minutes.
Milling of the material which is discharged from the mixer onto a mill consisting of three heating rolls which are maintained at a temperature in the vicinity of 90° C. in such a manner as to obtain the material in the form of sheets 1 to 2 mm. in thickness.
Introduction of the sheets produced as above into an extruding machine which is heated to 125–140° C. so as to form bands 4 mm. in thickness and 100 mm. in width.
Granulation with a conventional granulating press.
Shaping of the marking substances which can be carried out either by injection molding in suitable molds or by extrusion by means of a suitable extrusion press which is specially designed as will be explained below.

The first molding process requires that the operation which consists in filling the mold is carried out in a single stage in order to prevent bonding of material. The output is low on account of the need for cooling of the mold after each molding operation.

The second extrusion-shaping process is more economical than the first since it permits of a higher production rate and the fabrication of a greater number of marking substances of different sizes and profiles with minimum tooling. This extrusion process is the most suitable for large-scale production of marking substances.

In order to carry out this extrusion process, the granulated products or pellets are introduced into an extrusion press at a temperature of 120° C.–140° C. Extrusion is performed in water in the form of a rod which is cut off to the requisite lengths.

Prior to cutting off, the marking substances obtained can be polished externally—although this is not an essential requirement—or else coated with varnish, then marked or printed, sharpened to a point and packaged for sale.

The marking substances have a generally cylindrical or parallelipipedal shape and have a transverse cross-section forming any geometrical figure, the longest dimension of which does not in practice exceed 20 mm.

The equipment for producing by extrusion process the marking substances which are contemplated by the invention consists of an extrusion press which is characterized in that the die has a rectilineal portion, the length of which is substantially comprised between 10 and 20 times the diameter D.

It has in fact been found by experience that this unusual dimensional ratio was particularly well suited to the extrusion of the compound in the form of an homogeneous mass.

As a preferable feature, these arrangements are combined with a length of extruding screw which is comprised between 20D and 30D and preferably between 25D and 30D.

The elongated shape of the die has the effect of increasing the pressure within the screw and the head of the extrusion press and to orientate in a single direction both the thermoplastic material and the plasticizer. The mixture to be extruded has in fact a viscosity which is very much lower than that of the polyethylenes, which would result in appreciable turbulence produced by the rotation of the screw if the die were not elongated.

It will be apparent that the invention is not limited to the form of embodiment which has been described and that a number of alternative forms thereof can be devised.

In particular, there is nothing to prevent the utilization of the compound for the purpose of forming the cores or "leads" of conventional pencils, although this is not one of the essential objects of the invention. Furthermore, the marking substances themselves as well as the marks made by them can be rendered either luminescent phosphorescent or fluorescent by the addition of materials or pigments of suitable and known types. The constituent material of said substances may also be perfumed if so desired.

What I claim is:

1. In a marking material consisting essentially of a homogeneous mixture of polyethylene, at least one plasticizer compatible with polyethylene, a coloring material and a filler; the improvement comprising the polyethylene being present in an amount between 30% and 60% by weight of the whole, the plasticizer being present in an amount between 10% and 50% by weight of the whole, the coloring material and filler being present in an aggregate amount between 5% and 50% by weight of the whole, the polyethylene being a blend of low-pressure polyethylene and high-pressure polyethylene in a weight ratio of low-pressure polyethylene to high-pressure polyethylene between 0.25 and 1.5 to provide a marking member characterized by being erasable, relatively non-breakable, non-marking to the hands and sharpenable.

2. A marking material as claimed in claim 1, in the form of a rigid straight elongated solid stick.

3. A marking material as claimed in claim 1, having a melting point of at least 100° C.

4. A marking material as claimed in claim 1, the plasticizer being fusible below 100° C.

5. A marking material as claimed in claim 1, in which the coloring material is present in an amount between 5% and 20% by weight of the whole and the filler is present in an amount up to 30% by weight of the whole.

6. A marking material as claimed in claim 5, in which the coloring material and the filler are both carbon.

7. A marking material as claimed in claim 1, in which said low-pressure polyethylene has an average molecular weight of about 80,000 and a melting point of about 135° C., said high-pressure poyethylene has an average molecular weight of about 20,000 to about 50,000 and a melting point about 110° to 115° C.

8. A marking material as claimed in claim 1, said plasticizer including a substantial proportion of a waxy material melting in the range of 50–100° C.

9. A marking material as claimed in claim 1, said homogeneous mixture also containing 1–5% by weight of the whole of a member selected from the class consisting of polyvinyl chloride, polyisobutylene, polypropylene, halogenated polyethylenes, vinyl acetate resin and coumarone resin.

10. A marking material as claimed in claim 2, said stick having its exposed surfaces substantially comprised by said material and being free of toxic components.

11. A marking material as claimed in claim 1, said ratio being about 0.5.

12. A marking material as claimed in claim 2, having a melting point of at least 100° C., the coloring material being present in an amount between 5% and 20% by weight of the whole and the filler being present in a substantial quantity up to 30% by weight of the whole, said plasticizer including a substantial proportion of a waxy material melting in the range of 50–100° C.

References Cited

UNITED STATES PATENTS

| | | | |
|---|---|---|---|
| 2,268,501 | 12/1941 | Bradley | 260—759 |
| 2,380,126 | 7/1945 | Sturm | 260—738 |
| 2,462,331 | 2/1949 | Myers | 260—23 |
| 2,468,165 | 4/1949 | Brister et al. | 174—110 |
| 2,492,512 | 12/1949 | Zweig | 260—23 |
| 2,566,516 | 9/1951 | Derby | 260—23 |
| 2,988,784 | 6/1961 | Lorenian | 18—59 |
| 3,088,848 | 5/1963 | Tritsch | 117—122 |
| 3,183,283 | 5/1965 | Reding | 260—897 |
| 3,192,288 | 6/1965 | Sayko et al. | 260—897 |
| 3,262,904 | 7/1966 | Ripley | 260—41 |

DONALD E. CZAJA, *Primary Examiner.*

R. WHITE, *Assistant Examiner.*